United States Patent
An

(10) Patent No.: US 11,102,409 B2
(45) Date of Patent: Aug. 24, 2021

(54) ELECTRONIC DEVICE AND METHOD FOR OBTAINING IMAGES

(71) Applicant: Samsung Electronics Co., Ltd., Gyeonggi-do (KR)

(72) Inventor: Sungwook An, Gyeonggi-do (KR)

(73) Assignee: Samsung Electronics Co., Ltd

(*) Notice: Subject to any disclaimer, the term of this patent is extended or adjusted under 35 U.S.C. 154(b) by 20 days.

(21) Appl. No.: 16/657,171

(22) Filed: Oct. 18, 2019

(65) Prior Publication Data
US 2020/0128181 A1 Apr. 23, 2020

(30) Foreign Application Priority Data
Oct. 18, 2018 (KR) .................. 10-2018-0124674

(51) Int. Cl.
*H04N 5/232* (2006.01)
*H04N 5/14* (2006.01)

(52) U.S. Cl.
CPC ......... *H04N 5/23245* (2013.01); *H04N 5/144* (2013.01); *H04N 5/23218* (2018.08); *H04N 5/23222* (2013.01)

(58) Field of Classification Search
CPC ........... H04N 5/23245; H04N 5/23218; H04N 5/144; H04N 5/23222; H04N 7/188; H04N 5/23299; H04N 5/2258; G06T 2207/10016; G06T 2207/20104; G06T 7/20
See application file for complete search history.

(56) References Cited

U.S. PATENT DOCUMENTS

| | | | |
|---|---|---|---|
| 8,305,477 B2* | 11/2012 | Yamana | H04N 5/232945 348/333.02 |
| 9,866,766 B2 | 1/2018 | Urfalioglu et al. | |
| 2011/0096169 A1 | 4/2011 | Yu et al. | |
| 2013/0294741 A1 | 11/2013 | Mizuno | |
| 2014/0111608 A1 | 4/2014 | Pfeil | |
| 2015/0109468 A1* | 4/2015 | Laroia | H04N 5/345 348/208.6 |
| 2015/0229889 A1* | 8/2015 | Boettiger | H04N 5/23222 348/262 |

(Continued)

FOREIGN PATENT DOCUMENTS

| | | |
|---|---|---|
| EP | 3 079 346 | 10/2016 |
| EP | 3 316 568 | 5/2018 |
| KR | 20180055707 | 5/2018 |

OTHER PUBLICATIONS

European Search Report dated Jan. 14, 2020 issued in counterpart application No. 19204077.2-1208, 8 pages.

(Continued)

*Primary Examiner* — Shahbaz Nazrul
(74) *Attorney, Agent, or Firm* — The Farrell Law Firm, P.C.

(57) ABSTRACT

Various embodiments of the disclosure relate to an electronic device and an image capturing method thereof. The electronic device may include a plurality of cameras including a first camera and a second camera, a memory, and a processor. The processor is configured to perform high-speed shooting for image capture by changing a shooting speed of the first camera to a second frame rate greater than a first frame rate, in accordance with a change in information of at least one object in images captured using the second camera.

20 Claims, 11 Drawing Sheets

(56) References Cited

U.S. PATENT DOCUMENTS

| | | | |
|---|---|---|---|
| 2016/0155472 A1 | 6/2016 | Elg et al. | |
| 2018/0013955 A1* | 1/2018 | Kim | H04N 5/23238 |
| 2018/0107360 A1* | 4/2018 | Kim | G06F 3/04817 |
| 2018/0295292 A1* | 10/2018 | Lee | H04N 5/23216 |
| 2019/0303708 A1* | 10/2019 | Kim | H04N 5/2258 |

OTHER PUBLICATIONS

International Search Report dated Feb. 5, 2020 issued in counterpart application No. PCT/KR2019/013648, 8 pages.

* cited by examiner

ELECTRONIC DEVICE AND METHOD FOR OBTAINING IMAGES

CROSS-REFERENCE TO RELATED APPLICATION(S)

This application is based on and claims priority under 35 U.S.C. § 119 to Korean Patent Application No. 10-2018-0124674, filed on Oct. 18, 2018, in the Korean Intellectual Property Office, the entire disclosure of which is incorporated herein by reference.

BACKGROUND

1. Field

The present disclosure relates generally to an electronic device and an image capturing method thereof.

2. Description of Related Art

Electronic devices (e.g., a mobile terminal, a smart phone, a wearable electronic device, etc.) provide various functions. For example, a smart phone may provide short-distance wireless communication (e.g., Bluetooth, WiFi, near field communication (NFC), etc.), mobile communication (e.g., $3^{rd}$ generation (3G), $4^{th}$ generation (4G), $5^{th}$ generation (5G), etc.), a music or video playback function, a photo or video capturing function, a navigation function, and the like.

In general, electronic devices are capable of capturing (e.g., shooting) video at a rate of 30 frames per second (fps). In recent years, with the improvement of a transfer rate between an image sensor for obtaining an image in an electronic device and a memory for storing images obtained from the image sensor, more image frames may be stored in the memory than before during a specific period of time. Accordingly, an electronic device provides a function for performing high-speed shooting at a frame rate (e.g., 960 fps) greater than 30 fps.

In general, an electronic device provides a manual mode for performing high-speed shooting in accordance with a user's input, which may make it difficult to perform high-speed shooting on a fast (or instantly) moving object (or subject) or a desired moment (e.g., a moment at which a shooting star falls). For example, the object may vanish before the user presses a super-high speed shooting button (or a shooting menu, a shooting icon, etc.), or a desired moment for shooting may pass.

SUMMARY

An aspect of the present disclosure provides an electronic device and a recording method thereof capable of automatically performing super-high-speed shooting by using a plurality of cameras.

In accordance with an aspect of the present disclosure, an electronic device is provided. The electronic device includes a plurality of cameras including a first camera and a second camera, a memory, and a processor. In addition, the processor may be configured to perform high-speed shooting by changing a shooting speed of the first camera to a second frame rate higher than a first frame rate in accordance with a change in information of at least one object on images to be captured using the second camera.

In accordance with an aspect of the present disclosure, a method of an electronic device is provided. The method includes including a plurality of cameras including a first camera and a second camera may include, for example, detecting a change in information of at least one object on images captured using the second camera, and performing high-speed shooting by changing a shooting speed of the first camera to a second frame rate higher than a first frame rate based on the change in the information of the at least one object.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure are described with reference to the accompanying drawings. Specific embodiments are shown by way of example in the accompanying drawings and are described below in greater detail. It should be understood, however, that the embodiments are not intended to limit the disclosure to a particular form. For example, it is apparent to those ordinarily skilled in the art that the embodiments of the disclosure may be modified in various ways.

The term "ultra-low speed recording" indicates a recording scheme in which an image is captured at a speed (e.g., 960 fps) significantly faster than a typical shooting speed (e.g., 30 fps), and an image captured at a high speed is reproduced at a typical speed, thereby providing a slow motion effect to achieve a motion slower than the typical speed. For example, if an image is captured for 0.2 seconds at 960 fps and is reproduced at 30 fps, the image may be reproduced for 6.4 seconds. As such, the image captured for 0.2 seconds may be reproduced very slowly as an image captured for 6.2 seconds. In addition, the capture of an image at a high speed for ultra-low speed recording is referred to hereinafter as high-speed shooting.

Figure 1:
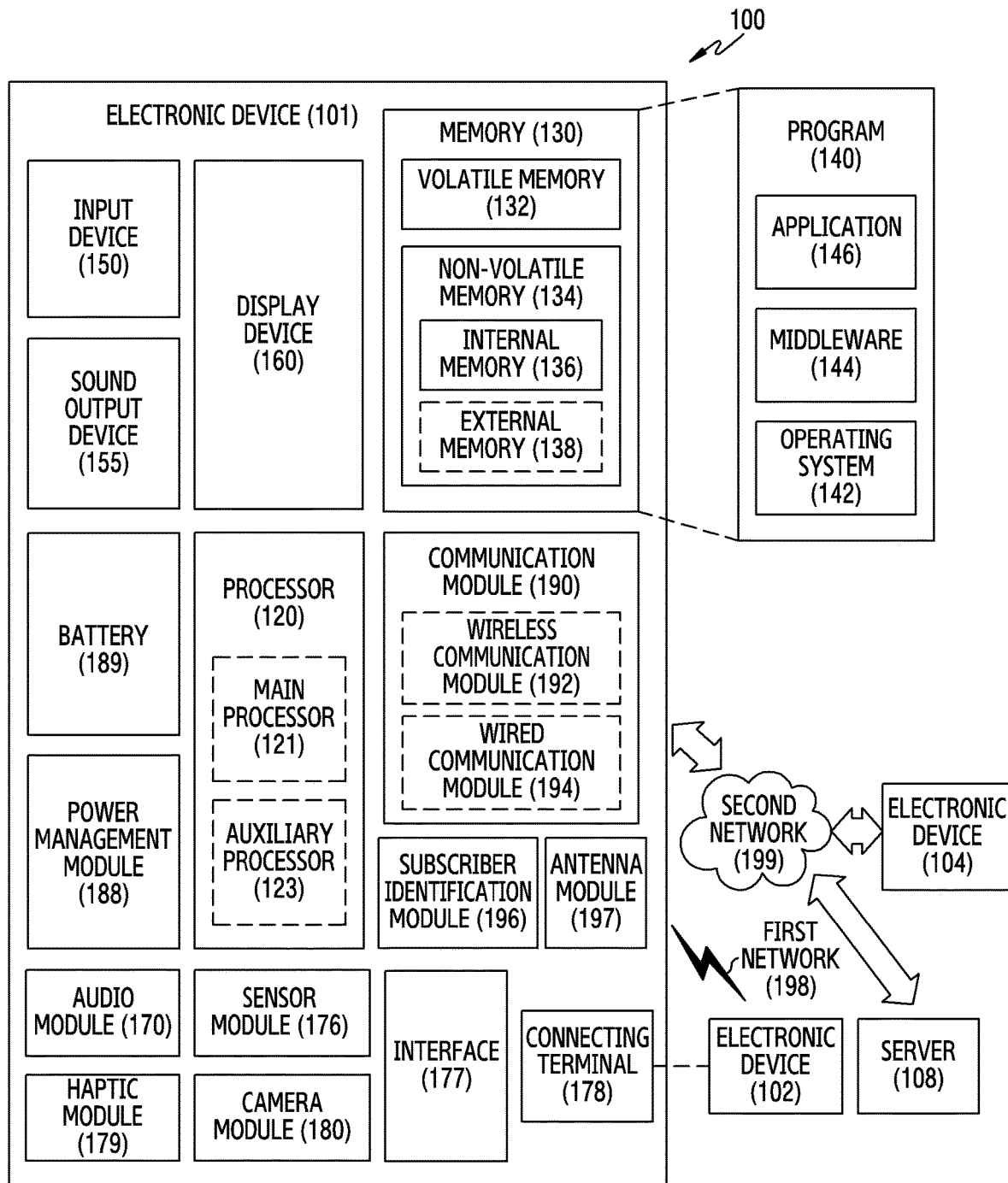
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, and an antenna module 197. Alternatively, at least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or a software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or adapted to a specific function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing a record, and the receiver may be used for incoming calls. The receiver may be implemented as separate from, or as part of, the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via the user's tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit (IC) or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 101 and the external electronic device 104 via the server 108 coupled with the second network 199. Each of the electronic device 102 and the electronic device 104 may be a device of a same type as, or a different type, from the electronic device 101. All or some of operations to be executed at the electronic device 101 may be executed at one or more of the electronic device 102, the electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
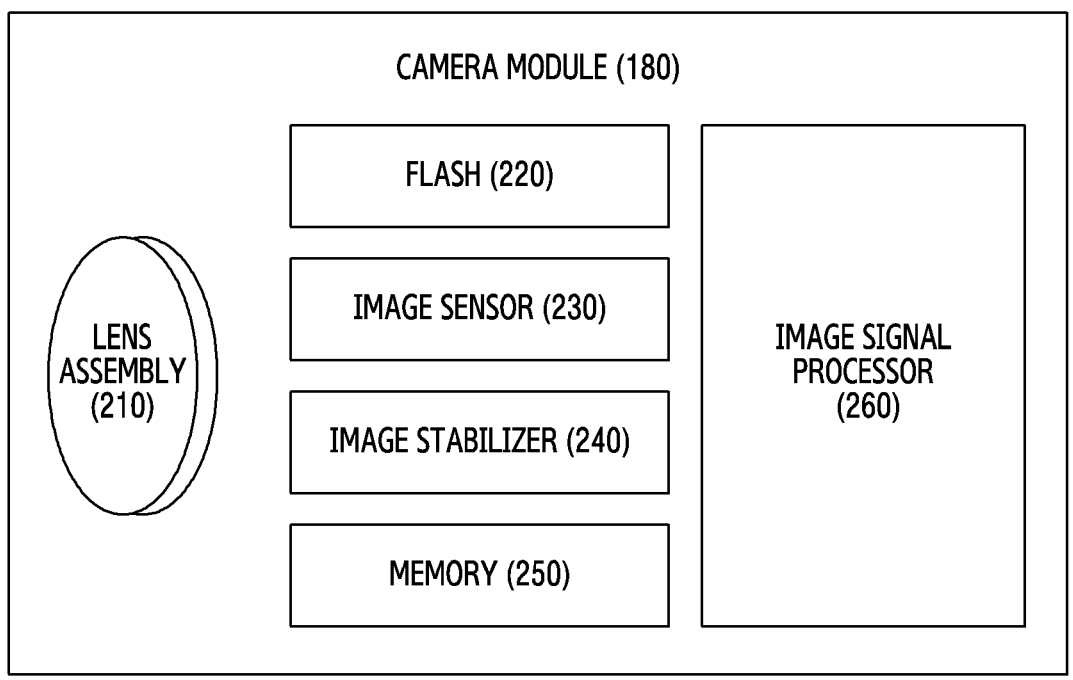
FIG. 2 is a block diagram of a camera module according to an embodiment.

FIG. 2 is a block diagram illustrating the camera module 180 according to an embodiment.

Referring to FIG. 2, the camera module 180 includes a lens assembly 210, a flash 220, an image sensor 230, an image stabilizer 240, memory 250 (e.g., buffer memory), and an image signal processor 260. The lens assembly 210 may collect light emitted or reflected from an object whose image is to be taken. The lens assembly 210 may include one or more lenses. The camera module 180 may include a plurality of lens assemblies 210. The camera module 180 may form a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from an object and transmitted via the lens assembly 210 into an electrical signal. The image sensor 230 may include one image sensor selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor or an acceleration sensor disposed inside or outside the camera module 180. The image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. The memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored in the memory 250 for further processing, or may be provided to an external component (e.g., the memory 130, the display device 160, the electronic device 102, the electronic device 104, or the server 108) outside the camera module 180. The image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

The electronic device 101 may include a plurality of camera modules 180 having different attributes or functions. At least one of the plurality of camera modules 180 may form a wide-angle camera and at least another of the plurality of camera modules 180 may form a telephoto camera. Similarly, at least one of the plurality of camera modules 180 may form a front camera and at least another of the plurality of camera modules 180 may form a rear camera.

The electronic device may be one of various types of electronic devices. The electronic devices may include a portable communication device (e.g., a smartphone), a computer device, a portable multimedia device, a portable medical device, a camera, a wearable device, or a home appliance. However, the electronic devices are not intended to be limited to those described above.

The various embodiments of the disclosure and the terms used herein are not intended to limit the disclosure to particular embodiments but are intended to include various changes, equivalents, or replacements for a corresponding embodiment. With regard to the description of the accompanying drawings, similar reference numerals may be used to refer to similar or related elements.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one, or all, of the possible combinations of the items enumerated together in a corresponding one of the phrases. As used herein, such terms as "$1^{st}$," "$2^{nd}$," "first," and "second" may be used to simply distinguish a corresponding component from another component, but does not limit the components in another aspect (e.g., importance or order).

If an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) may include a plurality of cameras including a first camera and a second camera (e.g., at least two camera modules 180 of FIG. 1), a memory (e.g., the memory 130 of FIG. 1 and the memory 250 of FIG. 2), and a processor (e.g., the processor 120 of FIG. 1). The processor 120 may be configured to perform high-speed shooting by changing a shooting speed of the first camera to a second frame rate higher than a first frame rate, in accordance with a change in information of at least one object on images captured using, for example, the second camera.

The processor 120 may set a first area of interest for images to be captured using the first camera and a second area of interest for images to be captured using the second camera, and change a shooting speed of the first camera by detecting a motion of the object in the set second area of interest.

The processor 120 may determine a time point for changing the shooting speed of the first camera by tracing the motion of the object in the second area of interest.

The processor 120 may trace a motion path of the at least one object, and determine a point in time for changing the shooting speed of the first camera by comparing the motion path of the at least one object and the first area of interest in terms of a distance and a direction The processor 120 may change the shooting speed of the first camera at a point in time at which the at least one object is located within a distance less than a reference value from the first area of interest in accordance with the motion path.

The second camera may include a wide-angle camera. The processor 120 may be configured such that the second area of interest includes the first area of interest.

The second camera may include a telephoto camera. The processor 120 may be configured such that the second area of interest includes the first area of interest.

The processor 120 may be configured to change the shooting speed of the first camera based on the speed change depending on the motion of the object.

The processor 120 may be configured to change a location of the second area of interest in accordance with the motion of the object.

The electronic device 101 may further include a third camera. The processor 120 may be configured to set a third area of interest for images to be captured using the third camera, and trace the motion of the object in the second area of interest based on the motion of the object in the set third area of interest, and change the shooting speed of the first camera.

The electronic device 101 may further include a third camera. The processor may be configured to set a third area of interest for images to be captured using the third camera, change the shooting speed of the first camera based on the motion of the object in the set second area of interest, change the shooting speed of the first camera based on the motion of the object in the set third area of interest, and provide control such that shooting based on the motion of the object in the second area of interest and shooting based on the motion of the object in the third area of interest are performed independently.

Figure 3:
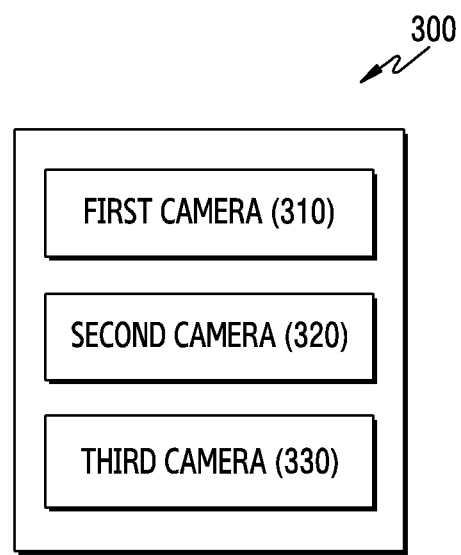
FIG. 3 is a block diagram of a plurality of cameras according to an embodiment.

FIG. 3 is a block diagram of a camera module 300 including a plurality of camera modules 180 according to an embodiment.

An electronic device (e.g., the electronic device 101 of FIG. 1) may have at least two camera modules 180. The electronic device 101 may include a first camera 310 and a second camera 320. The electronic device 101 may further include a third camera 330.

The first camera 310 may operate as a main camera. The second camera 320 may operate as a sub camera, but is not limited thereto. The second camera 320 may be implemented, for example, as a wide-angle camera or a telephoto camera. The third camera 330 may operate as a sub camera, but is not limited thereto. The third camera 330 may be implemented, for example, as a wide-angle camera or a telephoto camera.

The second camera 320 or the third camera 330 might not include some components of the camera module 180 such as the flash 220 or the stabilizer 240. For example, the first camera 310, the second camera 320, and the third camera 330 may be implemented to share an image signal processor (e.g., the image signal processor 260 of FIG. 2).

The first camera 310, the second camera 320, and the third camera 330 may be provided at the same position or at different positions of the electronic device 101. For example, the first camera 310 may be located on one side (e.g., a front side, rear side, or lateral side) of the electronic device 101. The second camera 320 or the third camera 330 may be provided at the same position or at a different position with respect to the first camera 310.

The first camera 310 may support high speed or super-high speed shooting several times to several tens of times faster than a first shooting speed (e.g., 30 fps). For example, the first camera 310 may support super-high speed shooting of a second shooting speed (e.g., 960 fps). The camera module 180 or first camera 310 may automatically move a focal point to a shooting object when super-high speed shooting is performed.

Hereinafter, it is described, for example, that the first camera 310 is implemented as a main camera, the second camera 320, which is a sub camera, is implemented as a wide-angle camera, and the third camera 330, which is a sub camera, is implemented as a telephoto camera.

In the following embodiments, each of operations may be performed in sequence, but may not necessarily be performed in sequence. For example, the order of each of the operations may be changed, and at least two operations may be performed in parallel. Herein, the electronic device may be the electronic device 101 of FIG. 1.

Figure 4:
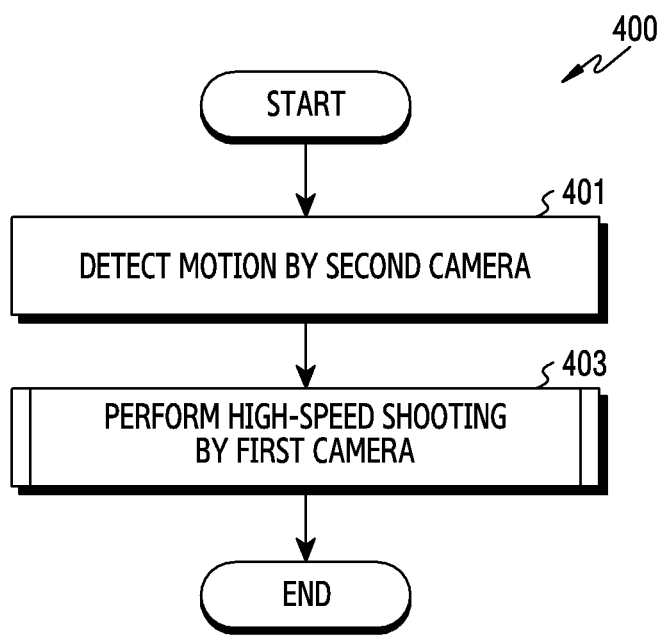
FIG. 4 is a flowchart of a method of performing high-speed shooting using a plurality of cameras in an electronic device according to an embodiment.
Figure 5:
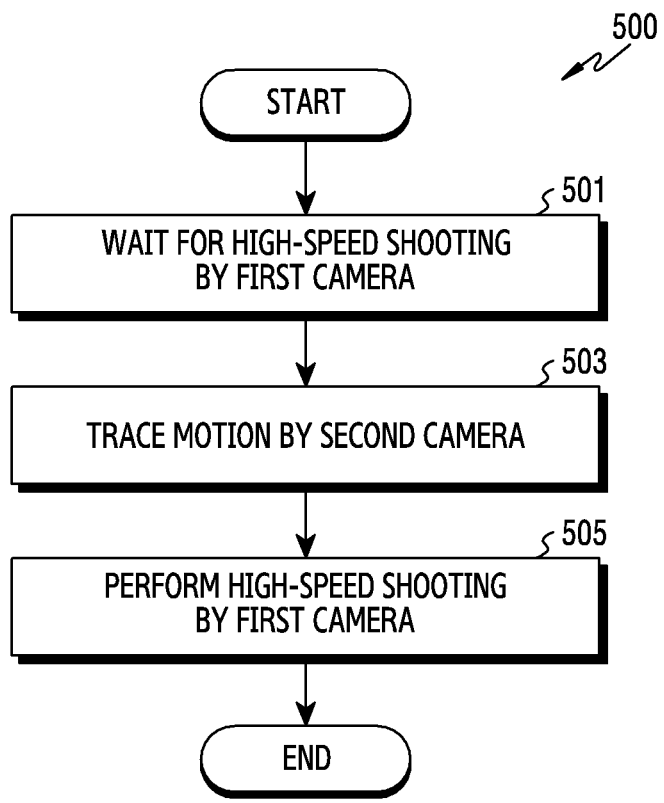
FIG. 5 is a flowchart of a method of performing high-speed shooting using a plurality of cameras in an electronic device according to an embodiment.
Figure 6:
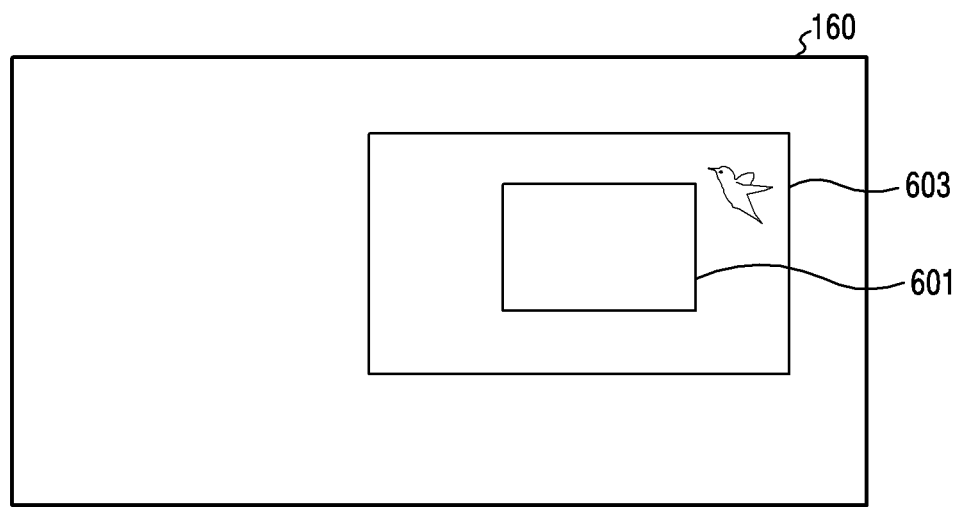
FIG. 6 is an illustration of performing high-speed shooting using a plurality of cameras in an electronic device according to an embodiment.

FIG. 4 is a flowchart of a method of performing high-speed shooting by using a plurality of cameras in an electronic device according to an embodiment. FIG. 5 is a flowchart of a method of performing high-speed shooting by using a plurality of cameras in an electronic device according to an embodiment. FIG. 6 is an illustration of performing high-speed shooting using a plurality of cameras in an electronic device according to an embodiment. Hereinafter, various embodiments are described with reference to FIGS. 4, 5, and 6.

Referring to FIG. 4, an electronic device (e.g., the electronic device 101 of FIG. 1) may include at least a first camera (e.g., the first camera 310 of FIG. 3) and a second camera (e.g., the second camera 320 of FIG. 3). Herein, the first camera 310 may be implemented as a main camera and the second camera 320 may be implemented as a sub camera.

When the first camera 310 is implemented as a main camera, at least part of an image obtained by the first camera 310 or a copy image may be displayed, for example, as a preview image, on a display (e.g., the display unit 160 of FIG. 1). An area of interest may be set for at least part of the image captured by the first camera 310. For example, the area of interest may also be set for an image captured by the first camera 310 and displayed on the display 160, but may also be set not for the part of the image but for the entirety of the image. The area of interest may be set fixedly at a specific location or may be set variably according to a motion of a specific object. The area of interest may be set fixedly based on a user input, or may be set automatically based on an image analysis result. In addition, if there is no image analysis result or additional input for setting the area of interest, the area of interest may be fixed at a specific location or may be set to move to start at the specific location according to a system configuration.

The area of interest may be set for at least part of an image captured by the second camera 320. For distinction, the area of interest set for the image captured by the first camera 310 is referred to as a first area of interest, and the area of interest set for the image captured by the second camera 320 is referred to as a second area of interest. The first area of interest may be the entirety of the image captured by the first camera 310 or the part of an image region captured by the first camera 310, and may be automatically designated or may be set by a user, for example, as a region of an object (e.g., a specific person) which is input by the user.

The second camera 320 is a sub camera, and an image captured by the second camera 320 may not be displayed on the typical display 160 when there is no special manipulation. The second camera 320 may be implemented as a wide-angle camera or a telephoto camera.

When the second camera 320 is implemented as the wide-angle camera, the second area of interest may be a region including the first area of interest or may be set to have a size of the entirety of an image captured by the first camera 310, but is not limited thereto. For example, the second area of interest may be set for part of a specific region of an image captured by the second camera 320 or may be set not for the part but for the entirety of the image. In addition, the second area of interest may be set as a region having the same size and same location as the first area of interest.

FIG. 6 illustrates an example in which a second area of interest 603 is set as a region including a first area of interest 601.

When the second camera 320 is implemented as the telephoto camera, the second area of interest may be set as a region included in the first area of interest or a region adjacent thereto, but is not limited thereto. The second area of interest may be set for part of a specific region of the image captured by the second camera 320, or may be set not for the part but for the entirety of the image. In addition, the second area of interest may be set as a region having the same size and same location as the first area of interest.

In step 401, a processor (e.g., the processor 120 of FIG. 1) of the electronic device 101 may identify whether a motion of the object is detected using the second camera 320. The detecting of the motion of the object is an example of a high-speed shooting trigger event. The trigger event for performing high-speed shooting may include various changes of image information in the second area of interest of the image captured using the second camera 320. For example, the change may include a case where there is a change in color (e.g., red) of an object included in the second area of interest in the image captured using the second camera 320, a case where there is a change in a shape (e.g., a face shape of a specific person, e.g., an expression change, an animal shape, a human shape, a specific object, or a figure shape), or a case where an object of a designated type is detected.

Upon generation of the high-speed shooting trigger event, in step 403, the processor 120 may control the first camera 310 to perform high-speed shooting. The first camera 310 may perform high-speed shooting on an image at a second frame rate (e.g., about 960 fps) under the control of the processor 120 based on the high-speed shooting event while the image is captured at a first frame rate (e.g., about 30 fps). The first camera 310 may automatically focus on the first area of interest or an event occurrence target object.

Operations of FIG. 5 described below may be at least part of step 403 of FIG. 4.

Referring to FIG. 5, upon identifying the high-speed shooting event occurrence such as motion detection of an object by the second camera 320 in step 401 of FIG. 4, the processor 120 may perform a preparation operation for high-speed shooting of the first camera 310 in step 501. The processor 120 may control a memory (e.g., the memory 130 of FIG. 1) to allocate a memory space for an image captured at a high speed, or may configure a buffer memory for at least temporarily storing a high-speed image obtained by controlling a memory (e.g., the memory 250 of FIG. 2) for a next image processing task.

In step 503, the processor 120 may trace a motion of an object detected by the second camera 320. The processor 120 may trace a motion path of the object by using at least some of a plurality of images obtained by the second camera 320.

Upon determining that the motion path of the object detected by the second camera 320 faces the first area of interest, in step 505, the processor 120 may control the first camera 310 at an expected point in time at which the object will enter inside the first area of interest, thereby performing high-speed shooting. A time duration of the high-speed shooting may be set by a user or may be set to a proper time, e.g., 0.2 seconds or 0.4 seconds, according to a resource such as memory capacity or image processing capacity of the electronic device 101 including the first camera 310.

Figure 7:
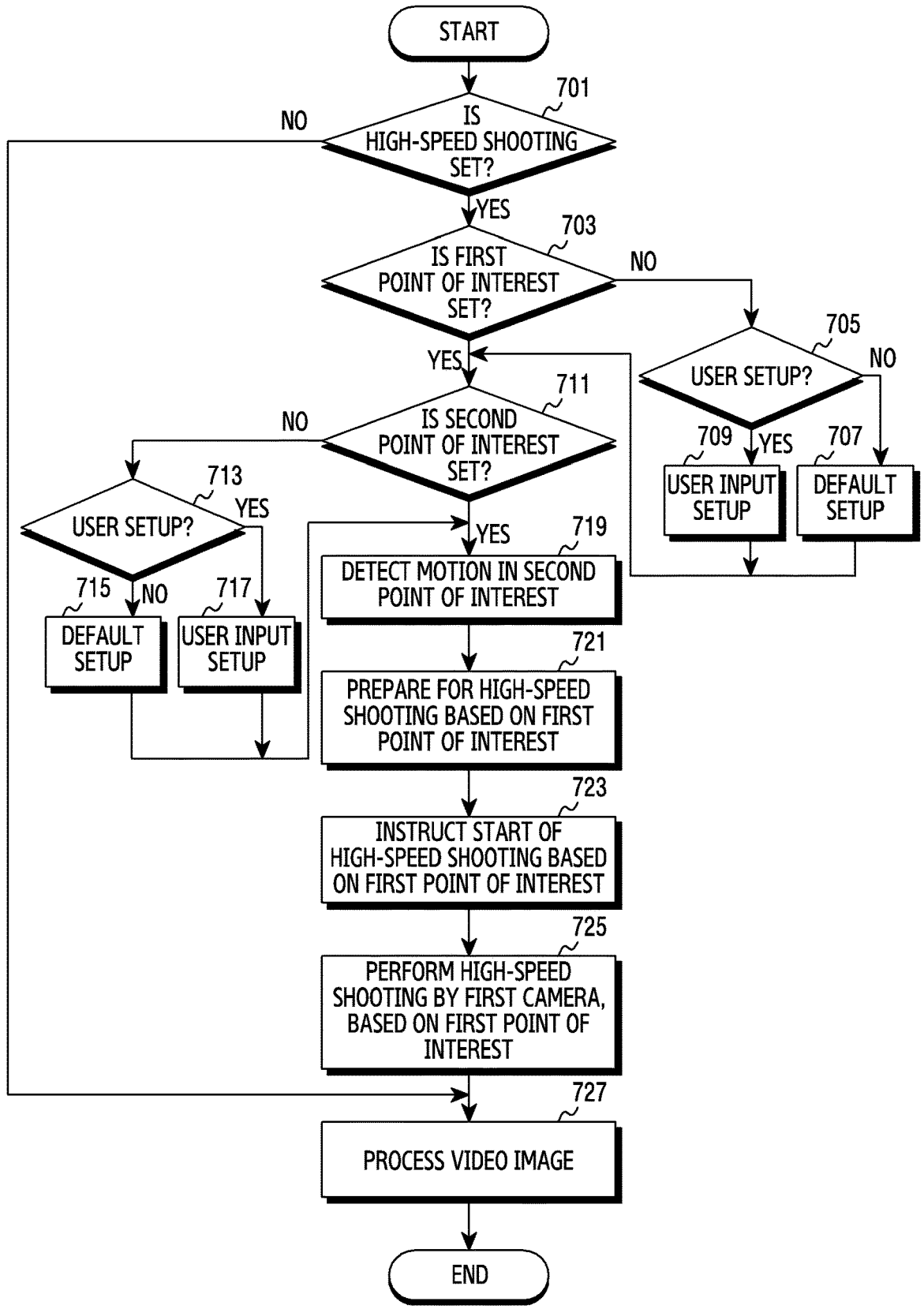
FIG. 7 is a flowchart of a method of performing high-speed shooting using a plurality of cameras in an electronic device according to an embodiment.
Figure 8:
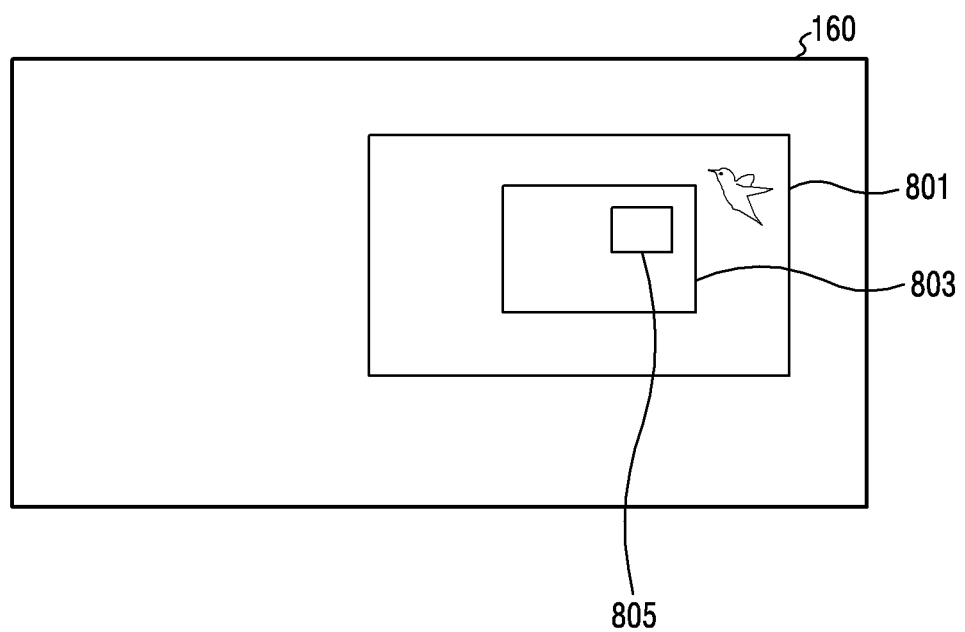
FIG. 8 is an illustration of performing high-speed shooting using a plurality of cameras in an electronic device according to an embodiment.

FIG. 7 is a flowchart of a method of performing high-speed shooting by using a plurality of cameras in an electronic device according to an embodiment, and FIG. 8 is an illustration 800 of performing high-speed shooting by using a plurality of cameras in an electronic device according to an embodiment.

Referring to FIG. 7, an electronic device (e.g., the electronic device 101 of FIG. 1) may include at least a first camera (e.g., the first camera 310 of FIG. 3) and a second camera (e.g., the second camera 320 of FIG. 3). Herein, the first camera 310 may be implemented as a main camera, and the second camera 320 may be implemented as a sub camera.

When the first camera 310 is implemented as the main camera, an image captured by the first camera 310 may be displayed as a preview image on a display (e.g., the display unit 160 of FIG. 1).

In step 701, a processor (e.g., the processor 120 of FIG. 1) may identify whether high-speed shooting mode is set. If the high-speed shooting mode is set, in step 703, the processor 120 may identify whether a first area (or point) of interest is set. If the first area of interest is set, in step 711, the processor 120 may identify whether a second area (or point) of interest is set for a captured image of the second camera 320.

To set a high-speed shooting mode, the electronic device 101 may provide a menu for setting the high-speed shooting mode as a sub menu of a camera setup menu, or may provide the menu for setting the high-speed shooting mode when there is a user input for setting an area of interest in a state where a preview image of the first camera 310 is displayed.

When the high-speed shooting mode is set but the first area of interest is not set, in step 705, the processor 120 may identify whether an input for setting the first area of interest is received from a user. The user may select a menu for setting the first area of interest from the high-speed mode setup menu or may set the first area of interest through an input on a specific location of a preview screen. Regarding the user input, a rectangular region having a corresponding size may be designated as the first area of interest, for example, based on a gesture (e.g., a user gesture of drawing a closed loop). In step 709, the processor 120 may set the area of interest depending on the user input as the first area of interest.

If there is no user input for setting the first area of interest, in step 707, the processor 120 may automatically set the first area of interest according to a system configuration. The processor 120 may set a region having a size (e.g., 1/10 of a screen size) pre-determined (or set) about a center of the preview screen as the first area of interest. In addition, the first area of interest may be set at a location of a specific object based on an image analysis result, or may be set to adjust a size of a region according to the number of objects or a size of the motion of the object.

In step 711, the processor 102 may identify whether the second area of interest is set for an image to be captured. If the second area of interest is not set, in step 713, the processor 120 may identify whether an input for setting the second area of interest is received from a user. The user may select a menu for setting the second area of interest from a menu for setting a high-speed shooting mode, or may set the second area of interest through an input on a specific location of the preview screen. However, a user input is actually not for a preview image for an image to be captured by the second camera 320, but may be configured such that a region corresponding to a selected location and size is set as the second area of interest for an image to be captured by the first camera 310. For example, the second area of interest may be set to have the same size and region as the first area of interest or a size and region including the first area of interest. A change in information of the first area of interest may be predicted based on a change in information of the second area of interest before a change occurs in the information of the first area of interest, thereby preparing for high-speed shooting of the first camera 310. In step 717, the processor 120 may set a region based on the user input as the second area of interest.

If there is no user input for setting the second area of interest, in step 715, the processor 120 may automatically set the second area of interest according to a system configuration. For example, the processor 120 may set a region including the first area of interest and having a size which is 3/2 of the first area of interest as the second area of interest. In addition, the second area of interest may be set at a location of a specific object based on an image analysis result, or may be set to adjust a size of a region according to the number of objects and a size of a motion of the object. When the second camera 320 is implemented as a wide-angle camera, the second area of interest may be set as a region including the first area of interest. When the second camera 320 is implemented as a telephoto camera, the second area of interest may be set as a region included inside the first area of interest.

Referring to FIG. 8, when the second camera 320 is implemented as a wide-angle camera, a region including, a first area of interest 801 set for an image to be captured by the first camera 310 may be set as a second area of interest 803. Unlike this, when the second camera 320 is implemented as a telephoto camera, a second area of interest 805 may be set as a region included in the first area of interest 801. This is only an example of setting the second area of interest, and various embodiments are not limited thereto.

In addition, referring to FIG. 8, when the electronic device 101 further includes the third camera 330, the second camera 320 may be implemented as a wide-angle camera, and the third camera 330 may be implemented as a telephoto camera. In this case, a plurality of second points of interest 803 and 805 may be set. In this case, for convenience, an area of interest set for an image captured by the second camera 320 is referred to as the second area of interest 803, and an area of interest set for an image captured by the third camera 330 is referred to as the third area of interest 805. The second area of interest 803 may be set as the same region as the first area of interest 801, a region included in the first area of interest 801, or the entire region of an image to be captured by the second camera 320. The third area of interest 805 may be set as the same region as the first area of interest 801 or a region included in the first area of interest 801. Accordingly, a high-speed shooting trigger event may occur upon detecting a change in image information or a motion of an object in the second area of interest 803 or third area of interest 805 of an image captured by the second camera 320 or the third camera 330. For example, when the third camera 330 is implemented as a telephoto camera, the third area of interest 805 may be included in the first area of interest 801. Accordingly, upon detecting the object by the third camera 330, the processor 120 may detect a motion of the detected object, and may generate a high-speed shooting trigger event at a time point at which a size (or a speed) of the motion is greater than or equal to a reference value. When the second camera 320 is implemented as the telephoto camera, accuracy in motion detection for the object can be more improved due to a high-resolution image.

The processor 120 may generate the high-speed shooting trigger event based on the detection of a change in information of the first area of interest, and may allow high-speed shooting to be performed by controlling a start time of first high-speed shooting. In addition, the processor 120 may allow the high-speed shooting to be performed by controlling a start time of second high-speed shooting based on the detection of a change in information of the second area of interest. The second high-speed shooting may be performed separately from the first high-speed shooting. In addition, the processor 120 may allow high-speed shooting to be performed by controlling a start time of third high-speed shooting based on the detection of a change in information of the third area of interest. The third high-speed shooting may be performed separately from the first high-speed shooting and the second high-speed shooting.

In step 719, the processor 120 of the electronic device 101 may identify whether a motion of an object is detected in the second area of interest by using the second camera 320. Detecting the motion of the object is an example of a high-speed shooting trigger event. The trigger event for performing high-speed shooting may include various changes of image information in the second area of interest of the image captured using the second camera 320. For example, the change may include a case where there is a change in color (e.g., red) of an object included in the second area of interest in the image captured using the second camera 320, a case where there is a change in a shape (e.g., a face shape of a specific person, for example, an expression change, an animal shape, a human shape, a specific object, or a figure shape), or a case where an object of a designated type is detected.

Upon an occurrence of the high-speed shooting trigger event, in step 721, the processor 120 may perform a preparation operation for the high-speed shooting of the first camera 310. The processor 120 may control a memory (e.g., the memory 130 of FIG. 1) to allocate a memory space for an image captured at a high speed, or may configure a buffer memory for at least temporarily storing a high-speed image obtained by controlling a memory (e.g., the memory 250 of FIG. 2) for a next image processing task.

In step 723, the processor 120 may trace the motion of the object detected by the second camera 320 to instruct a start of high-speed shooting of the first camera 310 with respect to the first area of interest. The processor 120 may trace a motion path of the object by using at least some of a plurality of images obtained by the second camera 320.

The processor 120 may trace a motion path of an object detected by the second camera 320, and if a distance to the first area of interest is less than or equal to a reference value, may control the first camera 310 to start high-speed shooting in step 725. The processor 120 may adjust the reference value according to a speed of the object. The processor 120 may calculate the distance to the first area of interest depending on the speed of the object and the motion path, may calculate an expected point in time at which the object will enter the first area of interest based on the distance, and may control the first camera 310 at this point in time to start high-speed shooting.

The processor 120 may control the first camera 310 to perform high-speed shooting during a period of time set by a user or set to a proper time, e.g., 0.2 seconds or 0.4 seconds, according to a resource such as memory capacity or image processing capacity of the electronic device 101 including the first camera 310. That is, the processor 120 may allow the first camera 310 to perform high-speed shooting on an image at a second frame rate (e.g., about 960 fps) under the control of the processor 120 based on the high-speed shooting event while the image is captured at a first frame rate (e.g., about 30 fps). The first camera 310 may automatically focus on the first area of interest or an event occurrence target object.

The processor 120 may control the image signal processor 260 to perform one or more image processes in step 727 with respect to a typical captured image including an image captured at a high speed by the first camera 310 and/or an image captured by another camera and stored in a memory (e.g., the memory 250 of FIG. 2).

Figure 9:
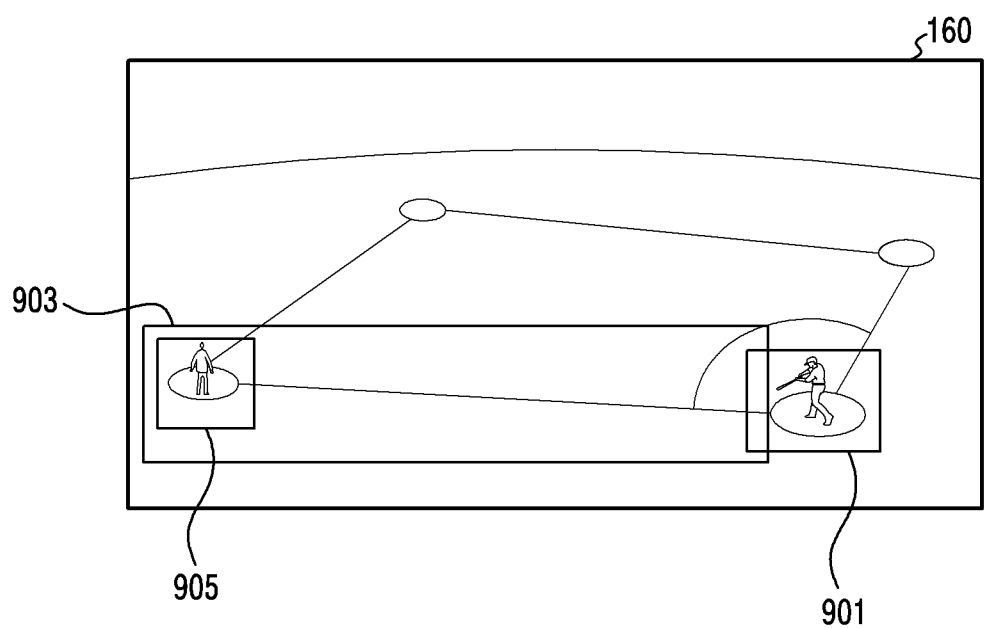
FIG. 9 is an illustration of performing high-speed shooting using a plurality of cameras in an electronic device according to an embodiment.

FIG. 9 is an illustration of performing high-speed shooting by using a plurality of cameras in an electronic device according to an embodiment.

Referring to FIG. 9, an electronic device (e.g., the electronic device 101 of FIG. 1) may include a third camera (e.g., the third camera 330 of FIG. 3) in addition to a first camera (e.g., the first camera 310 of FIG. 3) and a second camera (e.g., the second camera 320 of FIG. 3). The second camera 320 may be implemented as a wide-angle camera, and the third camera 330 may be implemented as a typical camera.

In addition, a plurality of second points of interest 903 and 905 may be set. For convenience, an area of interest set for an image captured by the second camera 320 is referred to as a second area of interest 903, and an area of interest set for an image captured by the third camera 330 is referred to as a third area of interest 905.

The second camera 320 is a wide-angle camera, and the second area of interest 903 may be set as a wide-range region including the third area of interest 905 and including at least part of the first area of interest 901. Therefore, if a motion of an object is detected in the third area of interest 905 by the third camera 330 or if the object disappears in the third area of interest 905, a processor (e.g., the processor 120 of FIG. 1) may allow the motion of the object to be traced based on an image captured by the second camera 320. In addition, the processor 120 may control the first camera 310 to perform high-speed shooting at a point in time at which the object reaches a distance less than or equal to a reference value from the first area of interest 901 according to the tracing of the object motion.

Figure 10:
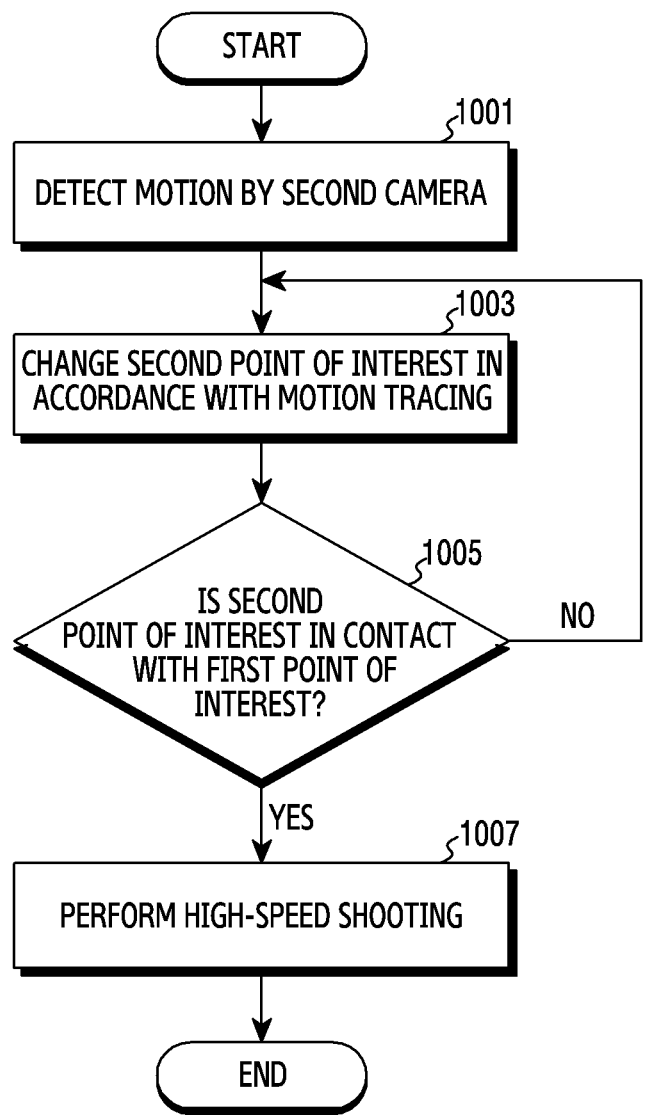
FIG. 10 is a flowchart of a method of performing high-speed shooting using a plurality of cameras in an electronic device according to an embodiment.
Figure 11:
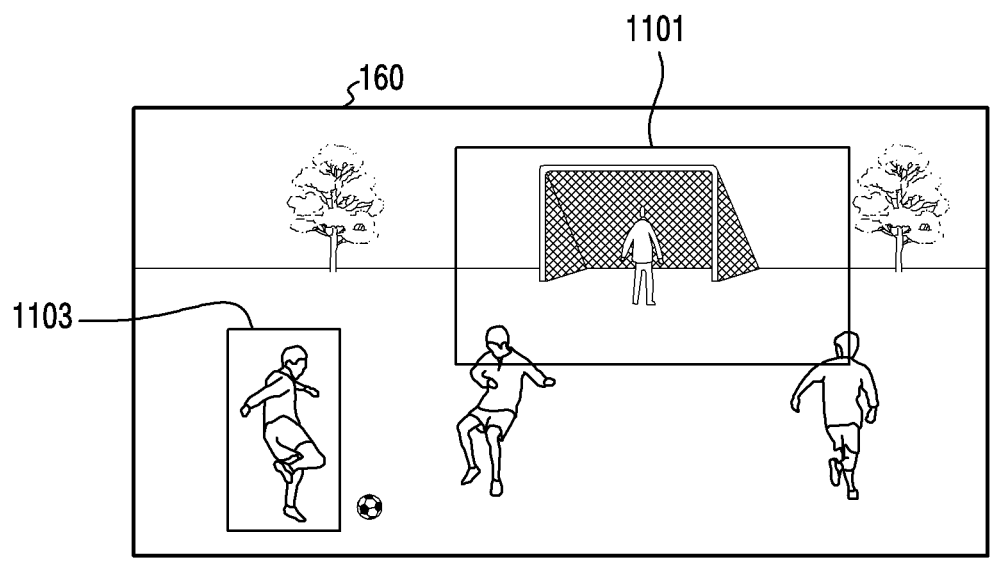
FIG. 11 is an illustration of performing high-speed shooting using a plurality of cameras in an electronic device according to an embodiment.

FIG. 10 is a flowchart of a method of performing high-speed shooting by using a plurality of cameras in an electronic device according to an embodiment, and FIG. 11 is an illustration of performing high-speed shooting by using a plurality of cameras in an electronic device according to an embodiment.

Referring to FIG. 10, an electronic device (e.g., the electronic device 101 of FIG. 1) may include at least a first camera (e.g., the first camera 310 of FIG. 3) and a second camera (e.g., the second camera 320 of FIG. 3). Herein, the first camera 310 may be implemented as a main camera, and the second camera 320 may be implemented as a sub camera.

An area of interest may be set fixedly at a specific location, or may be set variably according to a motion of a specific object. Referring to FIG. 11, a first area (or point) of interest 1101 set for an image captured by the first camera 310 may be set fixedly, and a second area (or point) of interest 1103 set for an image captured by the second camera 320 may be set variably. An initial location of the second area of interest 1103 may be set by a user input, and the location may be automatically moved based on an image analysis result.

Referring to FIG. 10, in step 1001, a processor (e.g., the processor 120 of FIG. 1) of the electronic device 101 may identify whether a motion of an object is detected in the second area of interest 1103 by using the second camera 320.

Upon detecting the motion of the object, in step 1003, the processor 120 may trace the motion of the object and thus may move the location of the second area of interest 1103.

In step 1005, the processor 120 may identify whether the second area of interest 1003 is in contact with the first area of interest 1101 according to the movement of the second area of interest 1103. That is, the processor 120 may calculate an edge location value (e.g., a vertex coordinate) of the first area of interest 1101 from an image captured by the first camera 310 and calculate an edge location value (e.g., a vertex coordinate) of the second area of interest 1103 from an image captured by the second camera 320 to identify whether the edge location value of the second area of interest 1103 approaches a value less than or equal to at least a reference value as the second area of interest 1103 varies.

Accordingly, if it is identified that the second area of interest 1103 is in contact with the first area of interest 1101, the processor 120 may control the first camera 310 to perform high-speed shooting. The first camera 310 may perform high-speed shooting on an image at a second frame rate (e.g., about 960 fps) under the control of the processor 120 while capturing the image at a first frame rate (e.g., about 30 fps). The first camera 310 may automatically focus on the first area of interest or an event generation target object.

An electronic device (e.g., the electronic device 101 of FIG. 1) may include a first camera and a second camera (e.g., at least two camera modules 180 of FIG. 1), and may perform high-speed shooting by changing a shooting speed of the first camera to the second frame rate greater than a first frame rate, in accordance with a change in information of at least one object on images to be captured using the second camera.

The processor 120 may set a first area of interest for images to be captured using the first camera and a second area of interest for images to be captured using the second camera, and may change a shooting speed of the first camera by detecting a motion of the object in the set second area of interest.

The processor 120 may determine a point in time for changing the shooting speed of the first camera by tracing the motion of the object in the second area of interest.

The processor 120 may trace a motion path of the at least one object and determine a point in time for changing the shooting speed of the first camera by comparing the motion path of the at least one object and the first area of interest in terms of a distance and a direction.

The processor 120 may change the shooting speed of the first camera at a point in time at which the at least one object is located within a distance less than a reference value from the first area of interest in accordance with the motion path.

The processor 120 may change the shooting speed of the first camera based on the speed change depending on the motion of the object.

The processor 120 may change a location of the second area of interest in accordance with the motion of the object.

The electronic device 101 may further include a third camera. The processor 120 may set a third area of interest for images to be captured using the third camera, may trace the motion of the object in the second area of interest based on the motion of the object in the set third area of interest, and may change the shooting speed of the first camera.

The electronic device 101 may further include a third camera. The processor 120 may set a third area of interest for images to be captured using the third camera, may change the shooting speed of the first camera based on the motion of the object in the set second area of interest, may change the shooting speed of the first camera based on the motion of the object in the set third area of interest, and may provide control such that shooting based on the motion of the object in the second area of interest and shooting based on the motion of the object in the third area of interest are performed independently.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. An electronic device, comprising:
   a plurality of cameras including a first camera and a second camera;
   a memory; and
   a processor configured to:
   set a first area of interest for images to be captured using the first camera and a second area of interest for images to be captured using the second camera, and
   trace a motion path of at least one object in images captured using the second camera, and perform high-speed shooting for image capture by changing a shooting speed of the first camera to a second frame rate greater than a first frame rate by comparing the motion path of the at least one object and the first area of interest based on a distance and a direction.

2. The electronic device of claim 1, wherein the processor is further configured to:
   change a shooting speed of the first camera by detecting a motion of the at least one object in the second area of interest.

3. The electronic device of claim 2, wherein the processor is further configured to determine a point in time for changing the shooting speed of the first camera by tracing the motion of the at least one object in the second area of interest.

4. The electronic device of claim 2, wherein the processor is further configured to:
   determine a point in time for changing the shooting speed of the first camera by comparing the motion path of the at least one object and the first area of interest based on the distance and the direction.

5. The electronic device of claim 4, wherein the processor is further configured to change the shooting speed of the first camera at a point in time at which the at least one object is located within the distance, wherein the distance is less than a reference value from the first area of interest in accordance with the motion path.

6. The electronic device of claim 2,
   wherein the second camera includes a wide-angle camera, and
   wherein the processor is further configured set the second area of interest to include the first area of interest.

7. The electronic device of claim 2,
   wherein the second camera includes a telephoto camera, and
   wherein the processor is further configured to set the second area of interest to include the first area of interest.

8. The electronic device of claim 7, wherein the processor is further configured to change the shooting speed of the first camera based on the motion of the at least one object.

9. The electronic device of claim 2, wherein the processor is further configured to change a location of the second area of interest in accordance with the motion of the at least one object.

10. The electronic device of claim 2, further comprising a third camera,
    wherein the processor is further configured to:
    set a third area of interest for images to be captured using the third camera;
    trace the motion of the at least one object in the second area of interest based on the motion of the at least one object in the set third area of interest; and
    change the shooting speed of the first camera.

11. The electronic device of claim 2, further comprising a third camera, wherein the processor is further configured to:

set a third area of interest for images to be captured using the third camera;

change the shooting speed of the first camera based on the motion of the at least one object in the set second area of interest;

change the shooting speed of the first camera based on the motion of the at least one object in the set third area of interest; and provide control such that shooting based on the motion of the at least one object in the second area of interest and shooting based on the motion of the at least one object in the third area of interest are performed independently.

12. A method of an electronic device including a plurality of cameras including a first camera and a second camera, the method comprising:

setting a first area of interest for images to be captured using the first camera and a second area of interest for images to be captured using the second camera;

tracing a motion path of the at least one object in the second area of interest; and performing high-speed shooting for image capture by changing a shooting speed of the first camera to a second frame rate greater than a first frame rate by comparing the motion path of the at least one object and the first area of interest based on a distance and a direction.

13. The method of claim 12, further comprising:

changing a shooting speed of the first camera based on detecting a motion of the at least one object.

14. The method of claim 13, further comprising determining a point in time for changing the shooting speed of the first camera by tracing the motion of the at least one object in the second area of interest.

15. The method of claim 13, further comprising:

determining a point in time for changing the shooting speed of the first camera by comparing the motion path of the at least one object and the first area of interest based on a distance and a direction.

16. The method of claim 15, wherein the shooting speed of the first camera changes at a point in time at which the at least one object is located within a distance less than a reference value from the first area of interest in accordance with the motion path.

17. The method of claim 13, wherein the shooting speed of the first camera changes based on the motion of the at least one object.

18. The method of claim 13, wherein a location of the second area of interest changes in accordance with the motion of the at least one object.

19. The method of claim 13, wherein the electronic device further includes a third camera, and the method further comprises:

setting a third area of interest for images to be captured using the third camera;

tracing the motion of the at least object in the second area of interest based on the motion of the at least one object in the third area of interest; and change the shooting speed of the first camera.

20. The method of claim 13, wherein the electronic device further includes a third camera, and the method further comprises:

setting a third area of interest for images to be captured using the third camera;

changing the shooting speed of the first camera based on the motion of the at least one object in the second area of interest; and changing the shooting speed of the first camera based on the motion of the at least one object in the third area of interest, wherein shooting based on the motion of the at least one object in the second area of interest and shooting based on the motion of the at least one object in the third area of interest are performed independently.

* * * * *